United States Patent
Ohashi et al.

(10) Patent No.: US 6,271,172 B2
(45) Date of Patent: Aug. 7, 2001

(54) METHOD FOR MANUFACTURING A CARBON DIOXIDE GAS ABSORBENT

(75) Inventors: Toshiyuki Ohashi, Kawasaki; Kazuaki Nakagawa; Hideyuki Ohzu, both of Yokohama; Yoshihiro Akasaka; Norihiro Tomimatsu, both of Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/126,794

(22) Filed: Jul. 31, 1998

(30) Foreign Application Priority Data

Jul. 31, 1997 (JP) .................................................. 9-205839

(51) Int. Cl.⁷ ............................. B01J 20/04; B01J 20/30
(52) U.S. Cl. ....................... 502/400; 502/344; 502/340; 423/230
(58) Field of Search .................................. 502/400, 344, 502/349, 340; 422/171; 423/230

(56) References Cited

U.S. PATENT DOCUMENTS

| | | |
|---|---|---|
| 3,557,011 | 1/1971 | Colombo et al. . |
| 5,595,832 * | 1/1997 | Tomimatsu et al. . |
| 5,866,090 * | 2/1999 | Nakagawa et al. . |
| 6,024,774 * | 2/2000 | Nakagawa et al. . |
| 6,037,076 * | 3/2000 | Tomimatsu et al. . |

FOREIGN PATENT DOCUMENTS 4-171042 6/1992 (JP) .

OTHER PUBLICATIONS

T. Mimura, et al., Energy Convers. Mgmt., vol. 36, No. 6–9, pp. 397–400, "Research and Development on Energy Saving Technology for Flue Gas Carbon Dioxide Recovery and Steam System in Power Plant", 1995.

K. Nakagawa, et al., Abstract No. 1073, The Electrochemical Society Meeting Abstracts, Nol. 98–1, "High Temperature $CO_2$ Absorption Using Lithium Zirconate Powder", May 3–8, 1998.

K. Nakagawa, et al., J. Electrochem. Soc., vol. 145, No. 4, pp. 1344–1346, "A Novel Method of $CO_2$ Capture From High Temperature Gases", Apr. 1998.

* cited by examiner

*Primary Examiner*—Wayne Langel
*Assistant Examiner*—Chrishna Ildebrando
(74) *Attorney, Agent, or Firm*—Oblon, Spivak, McClelland, Maier & Neustadt, P.C.

(57) ABSTRACT

The carbon dioxide gas absorbent of the present invention exhibits a high carbon dioxide gas absorption performance from an initial stage of the use. The carbon dioxide gas absorbent comprises of primary particles each containing lithium zirconia serving as a matrix, and eutectic compound molecules each containing lithium carbonate and at least one element selected from the group consisting of alkali metals excluding lithium, and alkali earth metals, which are dispersed in the matrix.

7 Claims, 1 Drawing Sheet

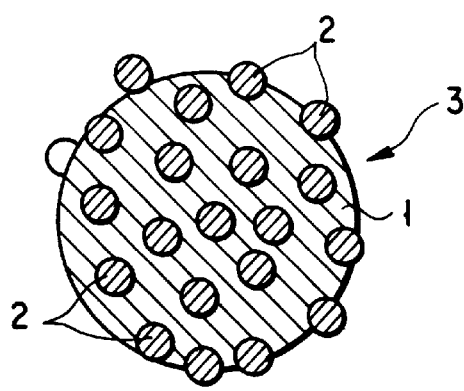
F I G. 1
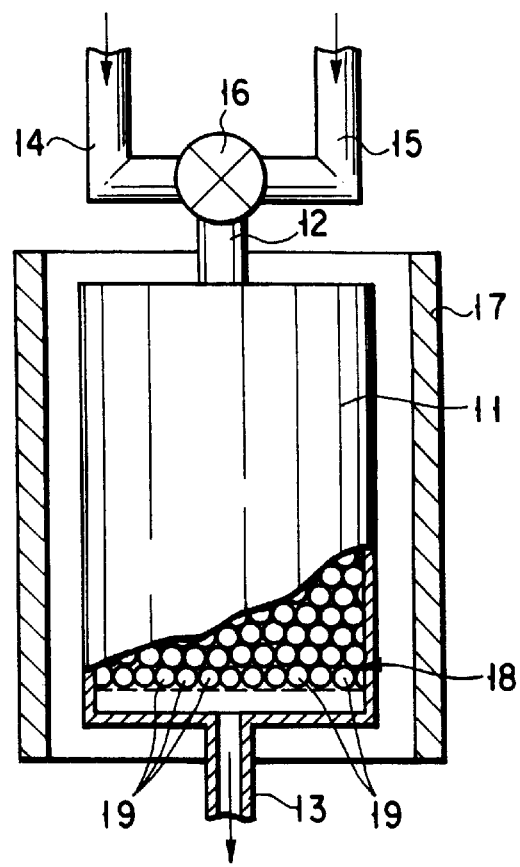
F I G. 2
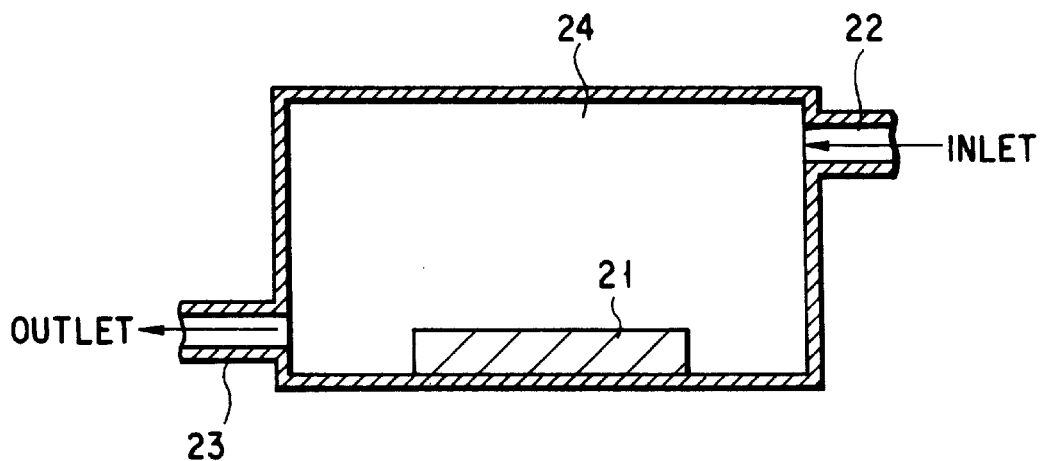
F I G. 3

METHOD FOR MANUFACTURING A CARBON DIOXIDE GAS ABSORBENT

BACKGROUND OF THE INVENTION

The present invention relates to a carbon dioxide gas absorbent, a method for manufacturing carbon dioxide gas absorbent and an apparatus for separating carbon dioxide gas, which are used for the separation and collection of carbon dioxide gas from a fuel gas or an exhaust gas in an energy plant which uses a fuel whose main component is hydrocarbon.

Known examples of the method of separating carbon dioxide gas from an exhaust gas are a type which utilizes a cellulose acetate film and a type which utilizes the chemical absorption process by an alkanol amine-based solvent.

However, in any of these example methods, it is required to set the upper limit of the temperature of the introduction gas to about 200° C. in consideration of the heat resisting properties of the materials for the film, solvent and the like employed in these methods. Therefore, in the case where carbon dioxide gas is separated from a system which exhaust a high-temperature exhaust gas, it is required to cool down the exhaust gas by a heat exchanger or the like, despite that the heat of the exhaust gas could be utilized in some way. Thus, as a result, the energy consumed for the separation of carbon dioxide gas increases, and therefore the usage of these methods is very much limited.

Under these circumstances, the inventors of the present invention have proposed the method of separating a carbon dioxide gas, which uses lithium zirconia (Jpn. Pat. Appln. KOKAI Publication No. 9-99214). With this method, it is possible to separate a carbon dioxide gas without undergoing a cooling step for cooling the high-temperature exhaust gas.

The above-mentioned KOKAI publication discloses the use of a carbon dioxide gas absorbent in the following manner. That is, lithium zirconia powder is mixed with a solvent and a binder to prepare a slurry, and the slurry is processed by a doctor blade method into a film having a porosity of about 55%. Then, after degreasing, a carbonate salt mixture of lithium carbonate and potassium carbonate are molten and impregnated into the porous film, thus obtaining a carbon dioxide gas absorbent.

However, the carbon dioxide gas absorbent disclosed in the publication does not exhibit a sufficient performance in the absorbing property of carbon dioxide gas at an initial stage of use.

BRIEF SUMMARY OF THE INVENTION

An object of the present invention is to provide a carbon dioxide gas absorbent exhibiting a high performance in the absorption of carbon dioxide gas from an initial stage of use.

Another object thereof is to provide a method capable of preparing a carbon dioxide gas absorbent exhibiting a high performance in the absorption of carbon dioxide gas from an initial stage of use, at a stable manner.

Still another object thereof is to provide a carbon dioxide gas absorbent capable of absorbing carbon dioxide gas exhausted from an energy plant or the like, efficiency at a relatively low temperature.

Still another object of the present invention is to provide a carbon dioxide gas separation apparatus having a carbon dioxide gas absorbent exhibiting a high performance in the absorption of carbon dioxide gas from an initial stage of use.

According to the present invention, there is provided a carbon dioxide gas absorbent comprising:

primary particles each having lithium zirconia serving as a matrix, and eutectic compound molecules containing lithium carbonate and at least one element selected from the group consisting of alkali metals excluding lithium, and alkali earth metals, which are dispersed in the matrix.

According to the present invention, there is further provided a method of preparing a carbonate gas absorbent, comprising the steps of:

mixing a first raw material component of a powder mixture of zirconia powder and lithium carbonate powder, and a second raw material component containing at least one selected from the group consisting of powder of an oxide and a carbonate salt of an alkali metal except for lithium, and powder of an oxide and a carbonate salt of an alkali earth metal, with each other; and making the powder mixture to react by heating.

According to the present invention, there is further provided a carbon dioxide gas absorbent comprising:

a first phase made of lithium zirconia represented by formula $Li_xZrO_y$, where x is 2, and y is (x+4)/2; and a second phase made of at least one lithium zirconia selected from the group consisting of those represented by the formula when x=4, 6 and 8, wherein the first phase and the second phase coexist.

According to the present invention, there is further provided a carbon dioxide gas separating apparatus comprising:

a reaction tower having a gas inlet section and a gas outlet section; and a carbon dioxide gas absorbent filled into the reaction tower, the carbon dioxide gas absorbent consisting of primary particles each containing lithium zirconia serving as a matrix, and eutectic compound molecules each containing lithium carbonate and at least one element selected from the group consisting of alkali metals excluding lithium, and alkali earth metals, which are dispersed in the matrix.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a cross section view schematically showing a carbon dioxide gas absorbent according to the present invention;

FIG. 2 is a cross sectional view schematically showing a carbon dioxide gas separating apparatus according to the present invention; and FIG. 3 is a schematic diagram illustrating a test apparatus for measuring the amount of carbon dioxide gas absorbed by the absorbents of the Examples 4 to 6 and Comparative Examples 4 and 5.

DETAILED DESCRIPTION OF THE INVENTION

The carbon dioxide gas absorbent according to the present invention will now be described with reference to examples.

The carbon dioxide gas absorbent according to the present invention contains a primary particle 3 having a lithium zirconia serving as a matrix 1, in which an eutectic compound 2 containing lithium carbonate and at least one element selected from the group consisting of alkali metals except for lithium and alkali earth metals.

The primary particle is defined as a phase in which particles individually exist without agglomerating with other particles, of the phases (powder types) in which a great number of particles exist.

Lithium zirconia ($Li_2ZrO_3$) permits that at least one element selected from the group consisting of oxides of lanthanoid elements, including yttrium oxide, and oxides of alkali earth metal elements, such as calcium oxide and magnesium oxide, is solid-solved. The amount of these oxides solid-solved to lithium zirconia should preferably be in a range of 1 to 10% by molar. When the amount of the oxides solid-solved is less than 1% by molar, it becomes difficult to sufficiently exhibit the effect of the solid solution, that is, the stabilization of the crystal structure of lithium zirconia. On the other hand, if the amount of these oxides solid-solved exceeds 10% by molar, there is a possibility that other zirconia compound than lithium zirconia is created. Therefore, the more preferable amount of the oxides is in a range of 3 to 10% by molar.

Examples of the eutectic compound are an eutectic compound of lithium carbonate and potassium carbonate, or an eutectic compound of lithium carbonate, potassium carbonate and magnesium oxide.

With regard to the eutectic compound in the primary particle, it is preferable that a part of each compound is exposed from the surface of the particle.

It is preferable that the eutectic compound in the primary particle should be dispersed at 1 to 35% by molar within lithium zirconia serving as the matrix. If the amount of the eutectic compound dispersed is set less than 1% by molar, there is a possibility that it becomes difficult to obtain a sufficiently high carbon dioxide absorbing performance at an initial stage of use of the absorbent. On the other hand, if the amount of the eutectic compound dispersed exceeds 35% by molar, the relative amount of lithium zirconia which directly contributes to the absorption of carbon dioxide gas is decreased. As a result, the amount of carbon dioxide gas which can be absorbed per one primary particle is decreased. The more preferable amount of the eutectic compound dispersed is in a range of 5 to 33% by molar.

It is preferable that the primary particles should have an average diameter of 0.01 to 10 $\mu$m. The eutectic compound molecules dispersed in one primary particle should preferably have an average diameter which is $\frac{1}{1000}$ to $\frac{1}{10}$ of that of the primary particles.

It is preferable that in one primary particle, a part of each eutectic compound is exposed from the surface of the particle. It is further preferable that the portions of the eutectic compound molecules, which are exposed from the surface of the particle, should occupy 10 to 30% by volume with respect to all the eutectic compound molecules dispersed in the matrix.

As regards the carbon dioxide gas absorbent of the present invention, is used in a phase in which a plurality of primary particles of the above-described type are aggregated, or in the form of a porous material prepared by processing a plurality of primary particles themselves, with a binder, into a slurry, and shaping and degreasing the slurry. The absorbent is used in the form of the porous material. However, it is permitted that the aggregate phase or the porous material may mixedly contain lithium zirconia in amount of 50% by volume or less.

As described above, according to the present invention, it is possible to provide a carbon dioxide gas absorbent exhibiting a high carbon dioxide absorbing performance at an initial stage of the use of the absorbent.

More specifically, lithium zirconia ($Li_2ZrO_3$) absorbs carbon dioxide gas by the following formula (1).

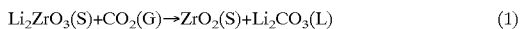
$$Li_2ZrO_3(S)+CO_2(G) \rightarrow ZrO_2(S)+Li_2CO_3(L) \qquad (1)$$

In the above formula, S, G, and L indicate solid, gas, and liquid, respectively.

The absorption of carbon dioxide gas by lithium zirconia is basically due to solid-gas reaction. More specifically, carbon dioxide gas is present on the surface of the solid body of lithium zirconia, and therefore the absorption rate of carbon dioxide gas is determined by the diffusion rate of lithium ion of lithium zirconia, which is the factor for capturing carbon dioxide gas, to the surface of the solid body of lithium zirconia. However, in the case where liquid-phase lithium carbonate is generated on the surface of the solid body of lithium zirconia by the reaction between lithium ions diffused on the surface of the solid body and carbon dioxide gas, carbon dioxide gas is diffused to the liquid-phase lithium carbonate via the liquid-phase lithium carbonate, and the diffusion of lithium ion to the liquid phase lithium carbonate occurs. Therefore, the reaction for absorbing carbon dioxide gas is promoted.

As regards the carbon dioxide gas absorbent made of solely lithium zirconia, the rate for absorbing carbon dioxide gas is promoted since liquid-phase lithium carbonate is generated during the reaction process. However, the reaction proceeds from the surface towards the inside, and therefore the rate for absorbing carbon dioxide gas is automatically limited.

By contrast, the carbon dioxide gas absorbent of the present invention consists of primary particles 3 in which an eutectic compound 2 containing lithium carbonate and at least one element selected from the group consisting of alkali metals except for lithium and alkali earth metals, are dispersed in a matrix 1 made of lithium zirconia, as shown in FIG. 1.

When carbon dioxide gas is brought into contact with the primary particles, the temperature of the gas contacted with the primary particles should be set to the melting point or higher than that of the eutectic compound molecules dispersed in each primary particle. Thus, the eutectic compound molecules will be in a liquid phase, and they densely connect with each other to form branch-like liquid-phase eutectic compound molecules extending from the surface of the particle towards the inside thereof.

As a result, carbon dioxide gas present on the surface of each primary particle can diffuse to the inside of the particle through the branch-like liquid-phase eutectic compound. On the other hand, lithium ion, which is the factor for capturing carbon dioxide gas within lithium zirconia serving as the matrix, is easily diffused towards the branch-shaped liquid-phase eutectic compound extending to the inside of the matrix. That is, the distance which lithium ion in lithium zirconia in the primary particle reaches carbon dioxide gas is substantially shortened, and the possibility that lithium ion in lithium zirconia present inside reaches carbon dioxide gas increases. Therefore, not only on the surface of each primary particle having lithium zirconia as a matrix, but also inside the particle, carbon dioxide gas and lithium zirconia quickly react with each other as represented by the formula (1), and therefore the rate for absorbing carbon dioxide gas can be increased.

Therefore, according to the present invention, the branch-shaped liquid phase eutectic compound is formed from the surface of the particle towards the inside thereof. With this structure, when carbon dioxide gas is brought into contact with the particle, the liquid phase eutectic compound serves as a bridge for lithium ion in lithium zirconia to reach carbon dioxide gas. As a result, it becomes possible to obtain a carbon dioxide gas absorbent which exhibits a high carbon dioxide gas absorbing performance from an initial stage of the use.

Further, since the melting point of the eutectic compound dispersed over each primary particle is lower than the temperature at which lithium zirconia and carbon dioxide gas react with each other to produce lithium carbonate as presented by the formula (1), and therefore it becomes possible to lower the temperature for absorbing carbon dioxide gas.

The method of preparing the above-described carbon dioxide gas absorbent will now be described.

First Step

First, the first raw material component (a) which is a mixture of zirconia powder and lithium carbonate powder, and the second raw material component (b) which is one selected from the group consisting of oxides and carbonate salts of alkali metals (except for lithium) in powder, and oxides and carbonate salts of alkali earth metals in powder, are mixed together.

Zirconia and lithium carbonate, which are of the first raw material component (a), are raw materials for producing lithium zirconia. Examples of the type of zirconia, which can be used in this invention, other than those represented by chemical formula: $ZrO_2$, are those of zirconia in which oxides of lanthanoid elements such as yttrium oxide and the like are solid-solved and those in which oxides of alkali earth metal elements such as MgO and CaO are solid-solved. The amount of oxide solid-solved should preferably be 1 to 10% by molar with respect to zirconia. The amount of the oxide solid-solved is set less than 1% by molar, it becomes difficult to sufficiently stabilize the crystal structure of lithium zirconia produced. On the other hand, if the amount of oxide solid-solved exceeds 10% by molar, it is possible that zirconia compounds other than lithium zirconia are generated. It is more preferable that the amount of oxide solid-solved should be in a range of 3 to 10% by molar.

It is preferable that the mixture ratio between lithium carbonate and zirconia ($Li_2CO_3$:$ZrO_2$) should be 1.01:1 to 1.15 to 1 in molar ratio, which indicates that lithium carbonate is excessively mixed.

Examples of the oxide of an alkali metal (except for lithium) which is the second raw material component (b) are $Na_2O$ and $K_2O$, and examples of carbonate salt thereof are $Na_2CO_3$ and $K_2CO_3$. Further, examples of the oxide of an alkali earth metal are MgO and CaO, and examples of the carbonate salt thereof are $MgCO_3$ and $CaCO_3$. Of these second raw material components, $Na_2CO_3$ and $K_2CO_3$ are particularly preferable.

It is preferable that the mixture ratio between the first raw material component and the second raw material component (the first raw material component: the second raw material component) should be 1:0.01 to 1 to 0.4 in molar ratio. When the mixture ratio of the second raw material component exceeds 0.4, there is a possibility that the durability of the absorbent synthesized is deteriorated.

It is preferable that both powders used for the first and second raw material components should have an average diameter of 0.01 to 10 $\mu$m.

A preferable example of the method of mixing the first and second raw material components is a wet mixing method using a solvent such as water or alcohol. For this mixing method, an organic binder such as polyvinyl alcohol may be added in order to obtain an absorbent having a predetermined shape.

Some other examples of the method of mixing the first and second raw material components are mixing them while solving them in an acid such as nitric acid, and mixing the components in the form of organic compounds.

Second Step

The mixture powder consisting of the first and second raw material components react by heating at a temperature of 400° C. or higher to manufacture a carbon dioxide gas absorbent consisting of primary particles having such a structure as shown in FIG. 1.

With the heat treatment, the mixture is transformed into lithium zirconia-based carbon dioxide gas absorbent. In other words, the heat treatment step is essential for imparting an absorbing property to the carbon dioxide gas. The lower limit of the heat treatment temperature, which is 400° C., is specified in consideration of the final baking of the absorbent and the removal of the binder. The heat treatment temperature varies depending upon the contents of the mixture. For example, in the case where $Li_2CO_3$ and $ZrO_2$ are used as the first raw material components and MgO and $K_2CO_3$ are used as the second raw material components, it is preferable that the heat treatment should be carried out at around 900° C. Or, in the case where $Li_2CO_3$ and $ZrO_2$ are used as the first raw material components and MgO and $K_2CO_3$ are used as the second raw material components, with further addition of an organic binder such as polyvinyl alcohol to these components, it is preferable that the heat treatment should be carried out at around 900° C. after degreasing at 400° C.

The heat treatment may be carried out in the atmosphere, or in the case where the carbon dioxide gas absorbent maintains the form of the oxide after the manufacture, the partial pressure of oxygen may be lower than that of the atmosphere.

According to the above-described aspect of the present invention, the first raw material component (a) which is a mixture of zirconia powder and lithium carbonate powder, and the second raw material component (b) which is one selected from the consisting of oxides and carbonate salts of alkali metals (except for lithium) in powder, and oxides and carbonate salts of alkali earth metals in powder, are mixed together. The powder mixture is heat-treated at a temperature of 400° C. or higher. In this manner, zirconia powder and lithium carbonate in the first raw material components react with each other to produce lithium zirconia. At a time, a residual lithium carbonate dispersed over the lithium zirconia and the second raw material components react with each other to produce an eutectic compound containing lithium carbonate and at least one element selected from the group consisting of alkali metals (except for lithium) and alkali earth metals is dispersed over the lithium zirconia as a matrix. As a result, a carbon dioxide gas absorbent consisting of primary particles having such a structure as shown in FIG. 1, in each of which an eutectic compound containing lithium carbonate and at least one element selected from the group consisting of alkali metals (except for lithium) and alkali earth metals is dispersed over a matrix of lithium zirconia is manufactured. With primary particles of this type, it is possible to manufacture a carbon dioxide gas absorbent exhibiting a high carbon dioxide absorbing performance from an initial stage of the use.

Next, the carbon dioxide gas separating apparatus according to the present invention will now be described with reference to FIG. 2.

As can be seen in FIG. 2, a cylindrical reaction tower 11 includes a gas supply tube 12 and a gas exhaust tube 13. The gas supply tube 12 branches out into a supply tube 14 for supplying gas containing carbon dioxide gas and a supply tube 15 for supplying a regeneration gas. A gas switch valve 16 is provided at the branching section of the supply tube 12. A cylindrical heater 17 capable of varying the temperature is provided on the outer side of the reaction tower 11 such as to surround the reaction tower 11.

The reaction tower 11 is filled with a carbon dioxide gas absorbent 18. The carbon dioxide gas absorbent is an aggregate of primary particles 19, in each of which an eutectic compound containing lithium carbonate and at least one element selected from the group consisting of alkali metals (except for lithium) and alkali earth metals is dispersed over a matrix of lithium zirconia.

Usable examples of the carbon dioxide gas-containing gas are carbon dioxide gas itself, and a gas obtained by diluting carbon dioxide gas with air. It is particularly preferable that an air-diluted carbon dioxide gas having a concentration of carbon dioxide gas of 10% by volume or more, should be used in order to enhance the carbon dioxide gas absorbing efficiency of the carbon dioxide gas absorbent.

A usable example of the regeneration gas is a mixture gas containing, for example, air, nitrogen gas and carbon dioxide gas. It is particularly preferable that a gas having a concentration of carbon dioxide gas of 90% by volume or less, should be used in order to enhance the rate of reproducing the absorbent after absorbing carbon dioxide gas, (that is, the rate of discharging carbon dioxide gas).

Other than the form of the aggregate of the primary particles, the carbon dioxide gas absorbent is obtained in the form of a porous material prepared by making a slurry of a plurality of primary particles and a binder, followed by shaping and degreasing. However, the aggregate or porous material permits that lithium zirconia powder is contained at an amount of 50% by volume or less.

The absorption of carbon dioxide gas (the separation of carbon dioxide gas) and the release of carbon dioxide gas (the regeneration of the carbon dioxide gas absorbent), carried out by the carbon dioxide gas separating apparatus having the above-described structure will now be described.
1) The Separation of Carbon Dioxide Gas First, the gas switch valve 16 is switched to send the gas being introduced to the reaction tower 11, to the supply tube 14 for the carbon dioxide gas-containing gas. The carbon dioxide gas-containing gas which is set to a temperature higher than the melting point of the eutectic compound of the primary particle, is supplied into the reaction tower 11 via the carbon dioxide gas-containing gas supply tube 14 and the supply tube 12, so as to bring the gas into contact sufficiently with the carbon dioxide gas absorbent 18. As the carbon dioxide gas-containing gas is brought into contact with the carbon dioxide gas absorbent, the carbon dioxide gas is absorbed by the absorbent, and the gas remaining after the separation of the carbon dioxide gas is exhausted via the exhaust tube 13 of the reaction tower 11.

It should be noted that when the carbon dioxide gas-containing gas is supplied to the reaction tower 11, the absorbent 18 filled in the reaction tower 11 may be heated with the heater 17 to a temperature higher than the melting point of the eutectic compound of the primary particle, if necessary.

The time duration in which the carbon dioxide gas-containing gas stays in the reaction tower 11 is determined appropriately in accordance with the composition, phase of the absorbent 18, the amount thereof which is filled in the reaction tower, and the like.
2) The Regeneration of Carbon Dioxide Gas Absorbent:

First, the gas switch valve 16 is switched to send the gas being introduced to the reaction tower 11, to the regeneration gas supply tube 15. The regeneration gas which is set to a predetermined temperature, is supplied into the reaction tower 11 via the regeneration gas supply tube 15 and the supply tube 12, so as to bring the regeneration gas into contact sufficiently with the absorbent 18 which has absorbed carbon dioxide gas. With the supply of the regeneration gas, carbon dioxide gas is released from the absorbent as the reaction represented by the formula (1) occurs in the reverse direction. Thus, the absorbent is regenerated and the regeneration gas containing the carbon dioxide gas is collected via the exhaust pipe 13 of the reaction tower 11.

It should be noted that when the regeneration gas is supplied to the reaction tower 11, the absorbent which has absorbed carbon dioxide gas in the reaction tower 11 may be heated in advance with the heater 17 to the temperature of the regeneration gas, if necessary.

The time duration in which the regeneration gas stays in the reaction tower 11 is determined appropriately in accordance with the carbon dioxide gas absorption state of the absorbent, the phase of the absorbent, the amount thereof which is filled in the reaction tower, and the like.

As described above, according to the present invention, the carbon dioxide gas can be separated from the high temperature gas containing carbon dioxide gas.

Further, with the structure that the gas supply tube is made to branch out into a carbon dioxide gas-containing gas supply tube and a regeneration gas supply tube, and a gas switch valve is provided at the branch section, it becomes possible to carry out the separation of carbon dioxide gas and the regeneration of the absorbent which has absorbed carbon dioxide gas using one reaction tower.

Further, a plurality of reaction towers each having a carbon dioxide gas-containing gas supply tube and a regeneration gas supply tube as shown in FIG. 2 are set up, it becomes possible to regenerate one reaction tower filled with the absorbent which has already absorbed carbon dioxide gas, while carrying out the absorption (separation) of carbon dioxide gas in another reaction tower. In this manner, the separation of carbon dioxide gas can be continuously carried out.

Next, another carbon dioxide gas absorbent according to the present invention will now be described in detail.

Such a carbon dioxide gas absorbent comprises a first phase and second phase which coexist. The first phase is made of lithium zirconia represented by formula $Li_xZrO_y$, where x is 2, and y is $(x+4)/2$. The second phase is made of at least one lithium zirconia selected from the group consisting of those compositions represented by the formula when x=4, 6 and 8.

It is preferable that the absorbent should be in a powder state having an average grain diameter in a range between 0.01 to 10 $\mu$m.

It is further preferable that the second phase should be contained at a ratio of 30% by weight with respect to the entire absorbent. If the content of the second phase is less than 30% by weight, it becomes difficult to achieve a sufficiently high absorption rate of carbon dioxide gas. The more preferable content of the second phase is 30 to 60% by weight.

Examples of the form of the carbon dioxide gas absorbent are pellets and sheets, in which the first and second phases are mixed. Further, other than the mixture of the first and second phases, the absorbent may be in the form of primary particles in which the compositions of the cases other than where x=2 in the formula, precipitate as the second phase in the course of synthesizing lithium zirconia.

In order to precipitate the compositions of the cases other than x=2 in the formula as the second phase in the synthesizing process, the starting material should contain zirconia powder in which elements such as magnesium and yttrium are partially substituted by zirconium element.

As described above, according to the present invention, it is possible to provide a carbon dioxide gas absorbent exhibiting a carbon dioxide gas absorbing performance over a wide range of temperatures.

More specifically, lithium zirconia represented by the formula when x=2, is $Li_2ZrO_3$ in chemical formula. Such lithium zirconia absorbs carbon dioxide gas as described by the reaction formula (2) below, whereas it absorbs carbon dioxide gas as described by the reaction formula (3) below.

$$Li_2ZrO_3(S)+CO_2(G) \rightarrow ZrO_2(S)+Li_2CO_3(L) \quad (2)$$

$$ZrO_2(S)+Li_2CO_3(L) \rightarrow Li_2ZrO_3(S)+CO_2(G) \quad (3)$$

In the above formulas, S, G, and L indicate solid, gas, and liquid, respectively.

Similarly, lithium zirconia represented by the formula when x=4, is $Li_4ZrO_4$ in chemical formula. Such lithium zirconia absorbs carbon dioxide gas as described by the reaction formula (4) below, whereas it absorbs carbon dioxide gas as described by the reaction formula (5) below.

$$Li_4ZrO_4(S)+2CO_2(G) \rightarrow ZrO_2(S)+2Li_2CO_3(L) \quad (4)$$

$$ZrO_2(S)+2Li_2CO_3(L) \rightarrow Li_4ZrO_4(S)+2CO_2(G) \quad (5)$$

Similarly, lithium zirconia represented by the formula when x=6, is $Li_6ZrO_5$ in chemical formula. Such lithium zirconia absorbs carbon dioxide gas as described by the reaction formula (6) below, whereas it absorbs carbon dioxide gas as described by the reaction formula (7) below.

$$Li_6ZrO_5(S)+3CO_2(G) \rightarrow ZrO_2(S)+3Li_2CO_3(L) \quad (6)$$

$$ZrO_2(S)+3Li_2CO_3(L) \rightarrow Li_6ZrO_5(S)+3CO_2(G) \quad (7)$$

Similarly, lithium zirconia represented by the formula when x=8, is $Li_8ZrO_6$ in chemical formula. Such lithium zirconia absorbs carbon dioxide gas as described by the reaction formula (8) below, whereas it absorbs carbon dioxide gas as described by the reaction formula (9) below.

$$Li_8ZrO_6(S)+4CO_2(G) \rightarrow ZrO_2(S)+4Li_2CO_3(L) \quad (8)$$

$$ZrO_2(S)+4Li_2CO_3(L) \rightarrow Li_8ZrO_6(S)+4CO_2(G) \quad (9)$$

As is clear from these reaction formulas, with regard to lithium zirconia represented by formula $Li_xZrO_y$ where x is a multiple of 2, including 2 or larger, and y is (x+4)/2, the following can be stated. The absorption and release amounts of carbon dioxide gas per 1 mole of lithium zirconia, are both 1 mole for the case where x=2 in the formula of lithium zirconia. Further, when x=4, the absorption and release amounts are both 2 mole, when x=6, 3 mole and when x=8, 4 mole. Thus, the absorption and release amounts of carbon dioxide gas increase remarkably when x increases from 4 to more in the composition of lithium zirconia.

In the meantime, regarding the temperature for absorption and release of carbon dioxide gas, the absorption and release easily occur at a temperature of 550° C. or less for the reaction formula (2), for example, especially when x=2 in the composition of lithium zirconia. In the case of the formula (3), the absorption and release easily occur particularly when the temperature is 650° C. or higher. Further, in the case where x=4, 6 and 8 in the compositions of lithium zirconia, the absorption and release of carbon dioxide gas occur at a higher temperature.

As described above, the carbon dioxide gas absorbent of the present invention comprises a first phase made of lithium zirconia represented by formula $Li_xZrO_y$, where x is 2, and y is (x+4)/2, and second phase made of at least one lithium zirconia selected from the group consisting of those compositions represented by the formula when x=4, 6 and 8. With this structure, it is able to realize a carbon dioxide gas absorbent capable of exhibiting an advantage of a high absorption and release performance of carbon dioxide gas even at low temperature, which is achieved by the first phase made of lithium zirconia of the case where x=2 in the composition, and another advantage of a high absorption and release performance of carbon dioxide gas at high temperature, which is achieved by the second phase made of lithium zirconia of the case selected from where x=4, 6 and 8 in the composition. Thus, the carbon dioxide absorbent of the present invention can achieve a high efficiency over a wide range of temperatures.

Preferred examples of the present invention will now be described in detail.

EXAMPLE 1

Lithium carbonate ($Li_2CO_3$) powder having a purity of 99.9% and an average diameter of 0.5 μm and 9-mole % MgO solid-solved $ZrO_2$ powder having a purity of 99.9% and an average diameter of 0.5 μm were weighed and mixed to have a ratio of 1.03:1 in molar, to prepare a first raw material components. Subsequently, the first raw material compound and a second raw material compound consisting of potassium carbonate ($K_2CO_3$) powder having a purity of 99.9% and an average diameter of 0.5 μm were wet-mixed together with ethanol in a mortar such as to have a ratio of 10:1 in molar. After that, the mixture was dried, and then heat-treated in atmosphere at 900° C. for 10 hours, thus completing a carbon dioxide gas absorbent having an average diameter of 10 μm.

The thus obtained carbon dioxide gas absorbent had the phase of primary particles, in each of which a matrix was made of lithium zirconia ($Li_2ZrO_3$) to which magnesium oxide was solid-solved, and an eutectic compound fine particles of lithium carbonate and potassium carbonate ($Li_2CO_3$:24 mole%, $K_2CO_3$:76 mole %) was uniformly dispersed in the matrix, and portions of eutectic compound fine particles were exposed from the surface of the matrix. The amount of the eutectic compound fine particles dispersed was 12% in molar with respect to lithium zirconia, and the average diameter of the fine particles was 0.8 μm.

EXAMPLE 2

Lithium carbonate ($Li_2CO_3$) powder having a purity of 99.9% and an average diameter of 0.5 μm and 8-mole % $Y_2O_3$ solid-solved $ZrO_2$ powder having a purity of 99.9% and an average diameter of 0.5 μm were weighed and mixed to have a ratio of 1.06:1 in molar, to prepare a first raw material components. Subsequently, the first raw material compound and a second raw material compound consisting of potassium carbonate ($K_2CO_3$) powder having a purity of 99.9% and an average diameter of 0.5 μm were wet-mixed together with ethanol in a mortar such as to have a ratio of 20:1 in molar. After that, the mixture was dried, and then heat-treated in atmosphere at 1000° C. for 10 hours, thus completing a carbon dioxide gas absorbent having an average diameter of 10 μm.

The thus obtained carbon dioxide gas absorbent had the phase of primary particles, in each of which a matrix was made of lithium zirconia ($Li_2ZrO_3$) to which yttria was solid-solved, and an eutectic compound fine particles of lithium carbonate and potassium carbonate ($Li_2CO_3$:38 mole %, $K_2CO_3$:62 mole %) was uniformly dispersed in the matrix, and portions of eutectic compound fine particles were exposed from the surface of the matrix. The amount of the eutectic compound fine particles dispersed was 10% in molar with respect to lithium zirconia, and the average diameter of the fine particles was 0.7 μm.

EXAMPLE 3

Lithium carbonate ($Li_2CO_3$) powder having a purity of 99.9% and an average diameter of 0.5 μm and zirconia ($ZrO_2$) powder having a purity of 99.9% and an average diameter of 0.5 μm were weighed and mixed to have a ratio of 1.1:1 in molar, to prepare a first raw material component.

Sodium carbonate ($Na_2CO_3$) powder having a purity of 99.9% and an average diameter of 0.5 μm and MgO powder having a purity of 99.9% and an average diameter of 0.2 μm were weighed and mixed to have a ratio of 1:1 in molar, to prepare a second raw material component.

Subsequently, the first raw material compound and the second raw material compound were wet-mixed together with ethanol in a mortar such as to have a ratio of 10:1 in molar. After that, the mixture was dried, and then heat-treated in atmosphere at 950° C. for 10 hours, thus completing a carbon dioxide gas absorbent having an average diameter of 10 μm.

The thus obtained carbon dioxide gas absorbent had the phase of primary particles, in each of which a matrix was made of lithium zirconia ($Li_2ZrO_3$), and an eutectic compound fine particles of lithium carbonate, potassium carbonate and magnesia ($Li_2CO_3$:33 mole %, $K_2CO_3$:33 mole %, MgO: 34 mole %) was uniformly dispersed in the matrix, and portions of eutectic compound fine particles were exposed from the surface of the matrix. The amount of the eutectic compound fine particles dispersed was 8% in molar with respect to lithium zirconia, and the average diameter of the fine particles was 0.6 μm.

COMPARATIVE EXAMPLE 1

Lithium carbonate ($Li_2CO_3$) powder having a purity of 99.9% and an average diameter of 0.5 μm and zirconia ($ZrO_2$) powder having a purity of 99.9% and an average diameter of 0.5 μm were weighed and mixed to have a ratio of 1.03:1 in molar, to prepare a raw material component. Subsequently, the thus obtained raw material component was solely wet-mixed together with ethanol in a mortar. After that, the mixture was dried, and then heat-treated in atmosphere at 900° C. for 10 hours, thus completing a carbon dioxide gas absorbent having an average diameter of 10 μm.

COMPARATIVE EXAMPLE 2

To lithium zirconia having an average diameter of 10 μm which was synthesized in a manner similar to that of the Comparative Example 1, a molten eutectic compound of lithium carbonate and potassium carbonate ($Li_2CO_3$:50 mole %, $K_2CO_3$:50 mole %) was impregnated such that the ratio between lithium zirconia and the eutectic compound is 10:1 in molar, and thus a carbon dioxide gas absorbent was prepared.

COMPARATIVE EXAMPLE 3

Lithium zirconia particles having an average diameter of 5 μm, which was synthesized in a manner similar to that of the Comparative Example 1, and potassium carbonate ($K_2CO_3$) powder having an average diameter of 1 μm were mixed such that the ratio between lithium zirconia and potassium carbonate was 10:1 in molar, and thus a carbon dioxide gas absorbent having the phase of the secondary particles was prepared.

The thus obtained carbon dioxide gas absorbent of the Examples 1 to 3 and Comparative Examples 1 to 3 were subjected to the absorption and release of carbon dioxide gas as the temperature is increased from room temperature to 650° C. at a rate of 5° C./min while allowing a gas containing air at 80% by volume and carbon dioxide gas at 20% by volume to flow at a rate of 200 mL/min. The maximum weight (in the case where carbon dioxide gas is absorbed) of each absorbent during the temperature increasing process was obtained by the thermogravimetric analysis. The weight increasing rate of each absorbent was calculated by the following equation:

Weight increasing rate (%)=$[(W_{max}-W_0)/W_0]\times 100$ where $W_{max}$ represents the maximum weight value of the absorbent, and $W_0$ represents the weight value of the absorbent before increasing the temperature.

Further, when the operation which was completed as the temperature was increased as described above and then cooled down back to room temperature again at a rate of 10° C./min is specified as one cycle, the weight increasing rates of each of the carbon dioxide gas absorbents of Examples 1 to 3 and Comparative Examples 1 to 3 at the fifth cycle and tenth cycle were calculated. The results are summarized in TABLE 1 below.

TABLE 1

| Carbon dioxide gas absorbent | | Weight increasing rate at initial stage | Weight increasing rate at 5th cycle | Weight increasing rate at 10th cycle |
|---|---|---|---|---|
| Example 1 | Primary particle (matrix: MgO solid-solved $Li_2ZrO_3$, eutectic compound: $Li_2CO_3$ + $K_2CO_3$) | 17 | 16 | 16 |
| Example 2 | Primary particle (matrix: $Y_2O_3$ solid-solved $Li_2ZrO_3$, eutectic compound: $Li_2CO_3$ + $K_2CO_3$) | 10 | 10 | 9 |

TABLE 1-continued

| | Carbon dioxide gas absorbent | Weight increasing rate at initial stage | Weight increasing rate at 5th cycle | Weight increasing rate at 10th cycle |
|---|---|---|---|---|
| Example 3 | Primary particle (matrix: $Li_2ZrO_3$, eutectic compound: $Li_2CO_3$ + $K_2CO_3$ + MgO) | 14 | 13 | 10 |
| Comparative Example 1 | $Li_2ZrO_3$ | 0.1 | 0.1 | 0.1 |
| Comparative Example 2 | $Li_2ZrO_3$ impregnated with eutectic compound ($Li_2CO_3$ + $K_2CO_3$) | 0.1 | 4 | 8 |
| Comparative Example 3 | Secondary Particle of $Li_2ZrO_3$ + $K_2CO_3$ | 0.1 | 3 | 7 |

As is clear from TABLE 1, the carbon dioxide gas absorbent of Examples 1 to 3 each exhibit a carbon dioxide gas absorption rate higher than those of the absorbents of Comparative Examples 1 to 3, and the carbon dioxide gas absorption rate is particularly high at the initial stage of the temperature increasing process.

EXAMPLE 4

Lithium carbonate ($Li_2CO_3$) powder having a purity of 99.9% and an average diameter of 0.5 μm and zirconia ($ZrO_2$) powder having a purity of 99.9% and an average diameter of 0.5 μm were weighed to have a ratio of 1:1 in molar, and these materials were wet-mixed together with ethanol in a mortar. After that, the mixture was dried, and then heat-treated in atmosphere at 850° C. for 10 hours, thus completing lithium zirconia powder having an average diameter of 1 μm and a composition of $Li_2ZrO_3$ ($Li_xZrO_y$, x=2, y=(x+4)/2).

Further, lithium carbonate ($Li_2CO_3$) powder having a purity of 99.9% and an average diameter of 0.5 μm and zirconia ($ZrO_2$) powder having a purity of 99.9% and an average diameter of 0.5 μm were weighed to have a ratio of 2:1 in molar, and these materials were wet-mixed together with ethanol in a mortar. After that, the mixture was dried, and then heat-treated in atmosphere at 950° C. for 10 hours, thus completing lithium zirconia powder having an average diameter of 1 μm and a composition of $Li_4ZrO_4$ ($Li_xZrO_y$, x=4, y=(x+4)/2).

Subsequently, the thus obtained $Li_2ZrO_3$ and $Li_4ZrO_4$ were fully mixed at 60% to 40% by weight respectively, in a mortar. Then, the mixture powder was filled into a metal mold and compressed therein, thus completing a compact (absorbent) having a thickness of about 1 mm.

EXAMPLE 5

$Li_2ZrO_3$ ($Li_xZrO_y$, x=2, y=(x+4)/2) powder which was synthesized in Example 4 and $Li_8ZrO_6$ ($Li_xZrO_y$, x=8, y=(x+4)/2) powder having an average diameter of 1 μm were fully mixed at 70% to 30% by weight respectively, in a mortar. Then, the mixture powder was filled into a metal mold and compressed therein, thus completing a compact (absorbent) having a thickness of about 1 mm.

EXAMPLE 6

Lithium carbonate ($Li_2CO_3$) powder having a purity of 99.9% and an average diameter of 0.5 μm and 9-mole % MgO solid-solved $ZrO_2$ powder having a purity of 99.9% and an average diameter of 0.5 μm were weighed to have a ratio of 1:1 in molar, and these materials were wet-mixed together with ethanol in a mortar. After that, the mixture was dried, and then heat-treated in atmosphere at 900° C. for 10 hours, thus synthesizing powder.

The thus obtained powder was examined by XRD analysis. The results indicated that two phases, namely $Li_2ZrO_3$ phase and $Li_4ZrO_4$ phase, were observed. The component ratio between these phases, calculated from the diffraction peak intensity of the XRD, was about 55% by weight of the $Li_2ZrO_3$ phase to about 45% by weight of the $Li_4ZrO_4$ phase.

Then, the powder was filled into a metal mold and compressed therein, thus completing a compact (absorbent) having a thickness of about 1 mm.

COMPARATIVE EXAMPLE 4

Lithium zirconia powder having a composition of $Li_2ZrO_3$, which was synthesized in Example 4, was molded and compressed, thus completing a compact (absorbent) having a thickness of about 1 mm.

With regard to the thus obtained absorbents of Examples 4 to 6 and Comparative Example 4, the following tests were carried out. That is, as shown in FIG. 3, each absorbent 21 was placed at a bottom portion of a container 24 having a gas inlet portion 22 at the upper right section thereof, and a gas outlet portion 23 at the lower left section, and 224 liter of a mixture gas consisting of 20% by volume of $CO_2$ and 80% by volume of air and having a temperature of 550° C. was allowed to flow into the container 24 from the gas inlet portion 22. Thus, the mixture gas was brought into contact with the absorbent for one hour so that the absorbent absorbs carbon dioxide gas. Subsequently, 224 liter of a mixture gas serving as a reference gas, consisting of 50% by volume of $CO_2$ and 50% by volume of air and having a temperature of 700° C. was allowed to flow into the container 24 from the gas inlet portion 22, so as to release the carbon dioxide gas absorbed in the absorbent. While allowing the reference gas to flow, the concentration of $CO_2$ gas exhausted from the gas outlet portion 23 of the container was measured. The results were summarized in TABLE 2 below.

It should be noted that TABLE 2 lists the results of similar tests for absorbing and releasing carbon dioxide gas, which were carried out with use of the absorbent (of Comparative Example 5) made of γ-alumina and having a thickness of 1 mm.

TABLE 2

| Carbon dioxide gas absorbent | | $CO_2$ concentration of reference gas | $CO_2$ concentration after treatment |
|---|---|---|---|
| Example 4 | Secondary particle ($Li_2ZrO_3$ 60 wt % + $Li_4ZrO_4$ 40 wt %) | 50.0 | 57.2 |
| Example 5 | Secondary particle ($Li_2ZrO_3$ 70 wt % + $Li_8ZrO_6$ 30 wt %) | 50.0 | 59.0 |
| Example 6 | Primary particle ($Li_2ZrO_3$ phase 55 wt % + $Li_4ZrO_4$ phase 45 wt %) | 50.0 | 57.5 |
| Comparative Example 4 | $Li_2ZrO_3$ | 50.0 | 54.3 |
| Comparative Example 5 | $Al_2O_3$ | 50.0 | 50.0 |

It can be clearly understood from TABLE 2 above that the absorbents of Examples 4 to 6 each can absorb a significantly greater amount of carbon dioxide gas as compared to the cases of the absorbents of Comparative Examples 4 and 5.

As described above in detail, according to the present invention, it is possible to provide a carbon dioxide gas absorbent exhibiting a high carbon dioxide gas absorbing performance from an initial stage of the use, and therefore such an absorbent can be utilized effectively for the separation and collection of carbon dioxide gas from an exhaust gas of an energy plant which uses a fuel whose main component is hydrocarbon.

Further, according to the present invention, there is provided a carbon dioxide gas absorbent preparation method capable of obtaining a carbon dioxide gas absorbent exhibiting a high carbon dioxide gas absorbing performance from an initial stage of the use, in a stable manner.

Furthermore, according to the present invention, there is provided a carbon dioxide gas separating apparatus containing a carbon dioxide gas absorbent exhibiting a high carbon dioxide gas absorbing performance from an initial stage of the use.

Furthermore, according to the present invention, there is provided a carbon dioxide gas absorbent capable of efficiently absorbing carbon dioxide gas in a wide range of temperatures, and therefore such an absorbent can be utilized effectively for the separation and collection of carbon dioxide gas from an exhaust gas of an energy plant which uses a fuel whose main component is hydrocarbon.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of preparing a carbonate gas absorbent, comprising:

mixing a first raw material component and a second raw material component to form a powder mixture, wherein said first raw material component is a mixture of zirconia powder and lithium carbonate powder, and wherein said second raw material component is at least one material selected from the group consisting of (i) a powder of an oxide or a carbonate salt of an alkali metal except for lithium, and (ii) a powder of an oxide or a carbonate salt of an alkaline earth metal; and heating said powder mixture, wherein the heating causes the zirconia and the lithium carbonate to react to produce a lithium zirconia matrix and further causes remaining unreacted lithium carbonate to react with said alkali metal or alkaline earth metal oxide or carbonate, thereby forming a eutectic compound dispersed over the lithium zirconia matrix.

2. The method according to claim 1, wherein said zirconia powder contains at least one element solid-solved therein, said at least one element being selected from the group consisting of oxides of lanthanide elements and oxides of alkaline earth metal elements.

3. The method according to claim 2, wherein an amount of a solid solution of the oxide, with respect to said zirconia is 1 to 10 mole %.

4. The method according to claim 1, wherein the powder of said first raw components and the powder of said second raw material components have an average diameter of 0.01 to 10 $\mu$m.

5. The method according to claim 1, wherein said lithium carbonate powder and said zirconia powder are mixed at a mole ratio of 1.01:1 to 1.15:1.

6. The method according to claim 1, wherein the first raw material component and the second raw material component are mixed at a mole ratio of 1:0.01 to 1:0.4.

7. The method according to claim 1, wherein the temperature of heating said first raw material and said second raw material is 400° C. or higher.

* * * * *